United States Patent
Xiang et al.

(10) Patent No.: US 12,537,061 B2
(45) Date of Patent: Jan. 27, 2026

(54) MEMORY OPERATING METHOD, MEMORY AND MEMORY SYSTEM

(71) Applicant: YANGTZE MEMORY TECHNOLOGIES CO., LTD., Wuhan (CN)

(72) Inventors: Li Xiang, Wuhan (CN); Wei Huang, Wuhan (CN); Ting Zhu, Wuhan (CN); Shuai Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 129 days.

(21) Appl. No.: 18/540,068

(22) Filed: Dec. 14, 2023

(65) Prior Publication Data

US 2025/0014651 A1 Jan. 9, 2025

(30) Foreign Application Priority Data

Jul. 6, 2023 (CN) .......................... 202310828089.X

(51) Int. Cl.
*G11C 16/16* (2006.01)
*G11C 16/04* (2006.01)
*G11C 16/08* (2006.01)

(52) U.S. Cl.
CPC .......... *G11C 16/16* (2013.01); *G11C 16/0483* (2013.01); *G11C 16/08* (2013.01)

(58) Field of Classification Search
CPC ..... G11C 16/16; G11C 16/0483; G11C 16/08; G11C 16/24; G11C 16/30; G11C 16/32
See application file for complete search history.

(56) References Cited

U.S. PATENT DOCUMENTS

| | | | |
|---|---|---|---|
| 2019/0272880 A1* | 9/2019 | Lee | H10B 43/27 |
| 2020/0402587 A1* | 12/2020 | Chibvongodze | G11C 11/5635 |
| 2022/0044733 A1* | 2/2022 | Lee | G11C 16/08 |
| 2022/0068389 A1* | 3/2022 | Takekida | G11C 16/16 |
| 2022/0093180 A1* | 3/2022 | Kwon | G11C 16/24 |
| 2024/0005997 A1* | 1/2024 | Shiga | G11C 16/14 |
| 2024/0021248 A1* | 1/2024 | Lee | G11C 16/14 |
| 2024/0153562 A1* | 5/2024 | Hioka | G11C 16/24 |
| 2024/0194269 A1* | 6/2024 | Kim | G11C 16/0483 |

FOREIGN PATENT DOCUMENTS

| | | |
|---|---|---|
| CN | 107545924 A | 1/2018 |
| CN | 111402944 A | 7/2020 |
| CN | 111798908 A | 10/2020 |
| CN | 115035939 A | 9/2022 |

* cited by examiner

*Primary Examiner* — Huan Hoang
*Assistant Examiner* — Justin Bryce Heisterkamp
(74) *Attorney, Agent, or Firm* — BAYES PLLC

(57) ABSTRACT

According to one aspect of the present disclosure, a method of operating a memory is provided. The method may include applying a bias voltage to a bottom select line of a second memory block of the memory during a first time period to turn on the bottom select transistor of the second memory block. The memory may include a first memory block and the second memory block, and the bottom select transistor is coupled to a bottom select line. The method may include performing a first erase operation during a second time period after the first time period by providing an erase operating voltage to a source line of the first memory block, and setting the bottom select line of the second memory block to a floating state.

20 Claims, 8 Drawing Sheets

60

```
┌─────────────────────────────────────────────────────┐
│ Apply a bias voltage to a bottom select line of a   │  S602
│ second memory block during a first time period to   │
│ turn on a bottom select transistor of the second    │
│ memory block                                        │
└─────────────────────────────────────────────────────┘
                          │
┌─────────────────────────────────────────────────────┐  S604
│ Perform a first erase operation on a first memory block │
│                                                     │
│  ┌───────────────────────────────────────────┐ S6042│
│  │ Provide an erase operating voltage to a   │      │
│  │ source line of the first memory block     │      │
│  └───────────────────────────────────────────┘      │
│                                                     │
│  ┌───────────────────────────────────────────┐ S6044│
│  │ Set the bottom select line of the second  │      │
│  │ memory block to a floating state          │      │
│  └───────────────────────────────────────────┘      │
└─────────────────────────────────────────────────────┘
```

FIG. 6

```
┌─────────────────────────────────────────────────────┐  S702
│ Perform a first erase operation on a first memory block │
└─────────────────────────────────────────────────────┘
                          │
┌─────────────────────────────────────────────────────┐  S704
│ Apply an erase control voltage to word lines of the │
│ first memory block, where the erase operating       │
│ voltage is greater than the erase control voltage   │
└─────────────────────────────────────────────────────┘
                          │
┌─────────────────────────────────────────────────────┐  S706
│ Set the bottom select line of the second memory     │
│ block to a floating state                           │
└─────────────────────────────────────────────────────┘
```

FIG. 7

MEMORY OPERATING METHOD, MEMORY AND MEMORY SYSTEM

CROSS-REFERENCE TO RELATED APPLICATIONS

This application claims the benefit of priority to Chinese Application No. 202310828089.X, filed on Jul. 6, 2023, which is incorporated herein by reference in its entirety.

TECHNICAL FIELD

The present disclosure relates to the field of memory technology, and in particular, to a memory operating method, a memory and a memory system.

BACKGROUND

Flash memory is a low-cost, high-density, non-volatile and solid-state storage medium that may be electrically erased and reprogrammed. Flash memory includes NOR flash memory and NAND flash memory. Various operations, such as reading, programming (writing), and erasing, may be performed by the flash memory to change the threshold voltage of each memory cell to a desired level. For NAND flash memory, erase operations may be performed at the block level, program operations may be performed at the page level, and read operations may be performed at the page level.

Information disclosed in the above background section is only used for enhancing the understanding of the background of the present disclosure, and therefore may include information that does not constitute related art known to those of ordinary skill in the art.

SUMMARY

According to one aspect of the present disclosure, a method of operating a memory is provided. The method may include applying a bias voltage to a bottom select line of a second memory block of the memory during a first time period to turn on the bottom select transistor of the second memory block. The memory may include a first memory block and the second memory block, and the bottom select transistor is coupled to a bottom select line. The method may include performing a first erase operation during a second time period after the first time period by providing an erase operating voltage to a source line of the first memory block, and setting the bottom select line of the second memory block to a floating state.

In some implementations, the performing the first erase operation may include applying an erase control voltage to a word line of the first memory block, the erase operating voltage being greater than the erase control voltage.

In some implementations, the method may include applying a first voltage to the source line during a third time period. In some implementations, the third time period may be after the second time period, and the first voltage may be less than the erase operating voltage.

In some implementations, the setting the bottom select line of the second memory block to the floating state may include setting the bottom select line of the second memory block to the floating state to a voltage of the bottom select line of the second memory block to ramp up, along with the source line, to a second voltage from the bias voltage. In some implementations, the second voltage may not be greater than a sum of the erase operating voltage and the bias voltage.

In some implementations, the method may include keeping the bottom select line of the second memory block in the floating state during a third time period to cause the voltage of the bottom select line of the second memory block to drop from the second voltage to the bias voltage to continue keeping the bottom select transistor of the second memory block turned on. In some implementations, the third time period may be after the second time period.

In some implementations, a sum of the erase operating voltage and the bias voltage may be less than a preset voltage threshold.

In some implementations, the performing the first erase operation may further include setting a word line of the second memory block to a floating state. In some implementations, the method may further include keeping the word line of the second memory block in the floating state during a third time period. In some implementations, the third time period may be after the second time period.

In some implementations, the second memory block may further include a third memory block, and the third memory block may be adjacent to the first memory block.

In some implementations, the method may include applying the bias voltage to the bottom select line of the second memory block during a fourth time period. In some implementations, the fourth time period may be after the third time period. In some implementations, the method may further include performing a second erase operation during a fifth time period after the fourth time period by providing the erase operating voltage to the source line of the first memory block, and setting the bottom select line of the second memory block to the floating state.

In some implementations, the bias voltage may range from 1V to 7V.

In some implementations, the memory may include a plurality of planes, the plurality of planes may include a first plane, the first plane may be a plane selected from the plurality of planes, and the first memory block and the second memory block may be located on the first plane.

According to another aspect of the present disclosure, a memory is provided. The memory may include a memory cell array. The memory cell array may include a plurality of memory blocks. The memory block may include a bottom select transistor. The bottom select transistor may be coupled to a bottom select line. The plurality of memory blocks may include a first memory block and a second memory block. The memory may include a peripheral circuit coupled to the memory cell array. The peripheral circuit may be configured to apply a bias voltage to the bottom select line of the second memory block during a first time period to turn on the bottom select transistor of the second memory block. The peripheral circuit may be configured to perform a first erase operation during a second time period after the first time period by providing an erase operating voltage to a source line of the first memory block, and setting the bottom select line of the second memory block to a floating state.

In some implementations, the peripheral circuit may include a control circuit, a voltage generator, a bottom select line driver, and a source line driver. In some implementations, the voltage generator may be configured to generate the bias voltage. In some implementations, the control circuit may be configured to control the bottom select line driver to apply the bias voltage to the bottom select line of the second memory block during the first time period to turn on the bottom select transistor of the second memory block.

In some implementations, the voltage generator may be configured to generate the erase operating voltage. In some implementations, the control circuit may be further configured to control the source line driver to apply the erase operating voltage to the source line of the first memory block during the second time period. In some implementations, the control circuit may be further configured to control the bottom select line driver to set the bottom select line of the second memory block to the floating state during the second time period.

In some implementations, the voltage generator may be further configured to generate an erase control voltage. In some implementations, the erase operating voltage may be greater than the erase control voltage. In some implementations, the peripheral circuit may further include a word line driver. In some implementations, the control circuit may be further configured to control the word line driver to apply the erase control voltage to a word line of the first memory block during the second time period.

In some implementations, the voltage generator may be further configured to generate a first voltage. In some implementations, the first voltage may be less than the erase operating voltage. In some implementations, the control circuit may be further configured to control the source line driver to apply the first voltage to the source line of the first memory block during a third time period. In some implementations, the third time period may be after the second time period.

In some implementations, the control circuit may be further configured to control the bottom select line driver to set the bottom select line of the second memory block to the floating state during the second time period to cause a voltage of the bottom select line of the second memory block to ramp up, along with the source line, to a second voltage from the bias voltage. In some implementations, the second voltage may not be greater than a sum of the erase operating voltage and the bias voltage.

In some implementations, the control circuit may be further configured to control the bottom select line driver to keep the bottom select line of the second memory block in the floating state during a third time period, causing the voltage of the bottom select line of the second memory block to drop from the second voltage to the bias voltage to continue keeping the bottom select transistor of the second memory block turned on. In some implementations, the third time period may be after the second time period.

In some implementations, a sum of the erase operating voltage and the bias voltage may be less than a preset voltage threshold.

In some implementations, the control circuit may be further configured to control the word line driver to set the word line of the second memory block to a floating state during the second time period. In some implementations, the control circuit may be further configured to control the word line driver to keep the word line of the second memory block in the floating state during a third time period. In some implementations, the third time period may be after the second time period.

In some implementations, the second memory block may include a third memory block, and the third memory block may be adjacent to the first memory block.

In some implementations, the peripheral circuit may be further configured to apply the bias voltage to the bottom select line of the second memory block during a fourth time period. In some implementations, the fourth time period may be after the third time period. In some implementations, the peripheral circuit may be further configured to perform a second erase operation during a fifth time period after the fourth time period by providing the erase operating voltage to the source line of the first memory block, and setting the bottom select line of the second memory block to the floating state.

In some implementations, the bias voltage may range from 1V to 7V.

In some implementations, the memory cell array may include a plurality of planes, the plurality of planes may include a first plane, the first plane may be a plane selected from the plurality of planes, and the plurality of memory blocks may include located on the first plane.

According to yet another aspect of the present disclosure, a memory system is provided. The method system may include a memory and a controller coupled to the memory. The memory may include a memory cell array and a peripheral circuit. The memory cell array may include a plurality of memory blocks. The memory block may include a bottom select transistor. The bottom select transistor may be coupled to a bottom select line. The plurality of memory blocks may include a first memory block and a second memory block. The peripheral circuit may be coupled to the memory cell array. The controller may be configured to control the peripheral circuit to apply a bias voltage to the bottom select line of the second memory block during a first time period to turn on the bottom select transistor of the second memory block. The controller may be configured to control the peripheral circuit to perform a first erase operation during a second time period after the first time period by providing an erase operating voltage to a source line of the first memory block, and setting the bottom select line of the second memory block to a floating state.

It should be understood that the forgoing general description and the following detailed description are provided by way of example and do not limit the present disclosure.

BRIEF DESCRIPTION OF THE DRAWINGS

The foregoing and other purposes, features, and advantages of the present disclosure will become more apparent by describing the embodiments thereof in detail with reference to the accompanying drawings.

FIG. 6 is a flowchart of a memory operating method according to some embodiments.

FIG. 7 shows a schematic diagram of the processing procedure of operation S604 shown in FIG. 6 according to an embodiment.

DETAILED DESCRIPTION

Figure 1:
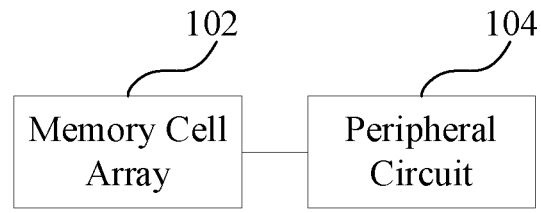
FIG. 1 shows a schematic structural diagram of a non-volatile memory to which the present disclosure may be applied.

Embodiments will now be described more comprehensively with reference to the accompanying drawings. Embodiments may, however, be implemented in various forms and should not be construed as being limited to the examples set forth herein; rather, these embodiments are provided so that the present disclosure will be more thorough and complete and comprehensively conveys the concepts of the embodiments to those skilled in the art. The accompanying drawings are merely schematic illustrations of the present disclosure and are not necessarily drawn to scale. The identical reference numerals in the drawings represent the same or similar parts, and thus their repeated description will be omitted.

Furthermore, the described features, structures or characteristics may be combined in any suitable manner in one or more embodiments. In the following description, numerous specific details are provided to give a thorough understanding of embodiments of the present disclosure. However, those skilled in the art will appreciate that the technical solutions of the present disclosure may be practiced without one or more of the specific details described. Alternatively, other methods, apparatuses, steps, etc. may be adopted. In other instances, well-known structures, methods, apparatuses, implementations, or operations are not shown or described in detail to avoid overshadowing and obscuring aspects of the disclosure.

Furthermore, the terms "first", "second", etc. are used for descriptive purposes only and cannot be understood as indicating or implying relative importance or implicitly indicating the quantity of indicated technical features. Therefore, features defined with "first" and "second" may explicitly or implicitly include one or more such features. In the description of the present disclosure, "plurality" means at least two, such as two, three, etc., unless otherwise explicitly and specifically limited. The symbol "/" generally indicates an "or" relationship between the related objects.

In the present disclosure, unless otherwise explicitly stated and limited, terms such as "connected" should be understood broadly, e.g., as being electrically connected or in communication with each other; it may be either directly connected or indirectly connected through an intermediate medium. For those of ordinary skill in the art, the specific meanings of the above terms in the present disclosure may be understood according to specific circumstances.

Some memories may perform an erase operation at the block level, e.g., erasing all the memory cells in a selected memory block at the same time. A plane of memory may include a plurality of memory blocks, and adjacent memory blocks share an array common source (ACS) wall. ACS wall usually serves to maintain chip stress. ACS wall may be processed with high resistance and low doping. For example, polysilicon (PolySi) may be doped with low concentration to form a nearly insulating ACS wall. Word lines (WLs) of adjacent memory blocks are coupled to the same ACS wall. The WLs of two adjacent memory blocks and the high-resistance, low-doping ACS wall may be equivalent to a capacitor, e.g., the parasitic capacitance. The WLs of two adjacent memory blocks are equivalent to two plates, and the ACS wall is equivalent to the dielectric material between the two plates. The parasitic capacitance may be coupled with the WL voltages of adjacent memory blocks on both sides of it.

For example, in the process of erasing a target memory block selected from multiple memory blocks on a plane, a low voltage is applied to the WLs of the target memory block, and the WLs of the memory blocks adjacent to the target memory block are floated, with the voltages thereof ramping up along with the channel to couple the potential. However, when there is a parasitic capacitance of a high-resistance, low-doping ACS wall between the adjacent memory blocks and the target memory block, the low voltage applied to the WLs of the target memory block will be divided trough the parasitic capacitance of the ACS wall, which affects the rate of voltage ramping up of the WLs of the adjacent memory blocks. This may cause the voltage ramping up of the WLs of the adjacent memory blocks to be inconsistent with that of the channel. A voltage difference may thus be formed after multiple erase cycles, which weakly erases the adjacent memory blocks and leads to a shift in the threshold voltage of the memory cells in adjacent memory blocks, thereby reducing the read-window margin or the voltage distribution spacing sum (e.g., edge sum (ESUM)) of the memory.

Therefore, the present disclosure provides a method of operating memory in which a bottom select transistor of a second memory block is turned on by applying a bias voltage to a bottom select line of the second memory block, in memory blocks adjacent to a first memory block, during a first time period. Then, a first erase operation is performed during a second time period after the first time period, where the first erase operation includes providing an erase operating voltage to a source line of the first memory block and setting the bottom select line of the second memory block to a floating state. In the discharge phase after the second time period, the bottom select line of the second memory block may float to the bias voltage, e.g., it is still in the conductive state. The gate induced drain leakage (GIDL) potential in the channel, which is generated due to the effect of voltage division of the parasitic capacitance of the ACS wall in the voltage ramping up phase, may continue to discharge to an initial potential (which, for example, may be Vss), and the effect of the voltage division of the parasitic capacitance of the ACS wall may be weakened at the WLs of the second memory block when the voltage thereof is coupled and ramps up along with the channel. During the discharge phase, the voltage thereof may be restored closer to the voltage before ramping up, so there will be no voltage accumulation in the next erase cycle. This in turn reduces the voltage difference between the channel and the WLs of the second memory block after a number of erase cycles, and reduces the loss in the read-window margin or the ESUM loss of the memory during the erase process.

Figure 2:
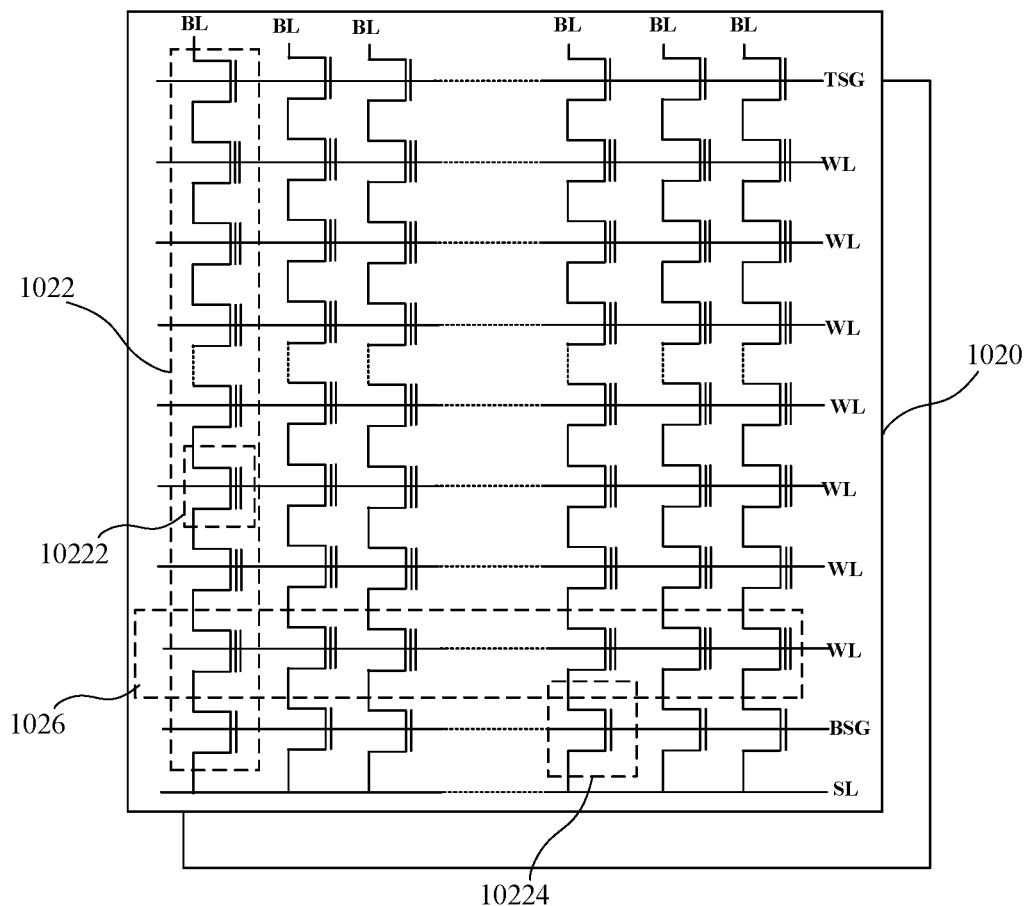
FIG. 2 shows a schematic diagram of a memory cell array of a NAND FLASH to which the present disclosure may be applied.
Figure 13:
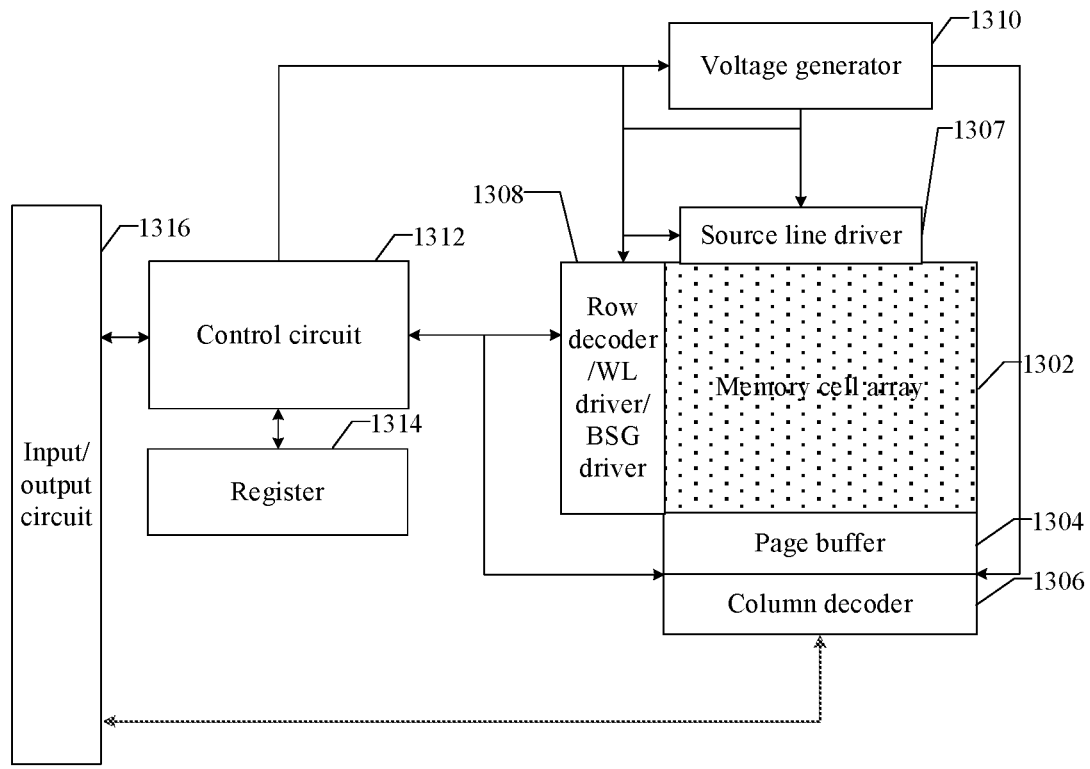
FIG. 13 is a structural block diagram of a memory shown according to FIG. 6 to FIG. 11.

FIG. 1 shows a schematic structural diagram of a nonvolatile memory to which the present disclosure may be applied. As shown in FIG. 1, a memory 10 may include a memory cell array 102 and a peripheral circuit 104 coupled to the memory cell array 102. The memory cell array 102 may be a NAND flash memory cell array. For example, FIG. 2 shows a schematic diagram of a memory cell array of a NAND flash. The peripheral circuit 104 may include any suitable analog, digital, and mixed-up signal circuit for implementing the operations of the memory cell array 102 by applying voltage signals and/or current signals to and sensing voltage signals and/or current signals from each of the target memory cells 10222 via bit lines (BLs), WLs, bottom select gate (BSG) lines, top select gate (TSG) lines, and the like (referring to FIG. 2). The peripheral circuit 104 may include various types of peripheral circuits formed by using metal-oxide-semiconductor (MOS) technology. For example, FIG. 13 shows an example peripheral circuit.

FIG. 2 shows a schematic diagram of a memory cell array of a NAND FLASH to which the present disclosure may be applied. As shown in FIG. 2, in a memory cell array 102, memory cells 10222 in memory blocks 1020 are provided in an array of NAND memory strings 1022, and each NAND memory string 1022 extends vertically above a substrate (not shown). In some embodiments, each NAND memory string 1022 includes a plurality of memory cells 10222 coupled in series and vertically stacked. Each memory cell 10222 may hold a continuous analog value, such as voltage or charge, depending on the number of electrons trapped within a region of the memory cell 10222. Each memory cell 10222 may be either a floating gate type of memory cell including a floating-gate transistor or a charge trap type of memory cell including a charge-trap transistor.

In some embodiments, each memory cell 10222 may be a single-level cell (SLC) that has two possible memory states and thus, can store one bit of data. For example, a first memory state "0" may correspond to a first voltage range, and a second memory state "1" may correspond to a second voltage range.

In some embodiments, each memory cell 10222 may be a multi-level cell (MLC) that is capable of storing more than a single bit of data in more than four memory states. For example, the MLC may store two bits per cell, three bits per cell (also known as triple-level cell (TLC)), or four bits per cell (also known as a quad-level cell (QLC)). Each MLC may be programmed to adopt a range of possible nominal storage values. In one example, if each MLC stores two bits of data, then the MLC may be programmed to adopt one of three possible programming levels from an erased state by writing one of three possible nominal storage values to the cell. A fourth nominal storage value may be used for the erased state.

As shown in FIG. 2, each NAND memory string 1022 may include a bottom select transistor 10224 with a BSG at its source end, and a top select transistor 10226 with a TSG at its drain end. BSG and TSG may be configured to activate a selected NAND memory string 1022 (a column of the array) during read and program operations. In some embodiments, the sources of NAND memory strings 1022 in the same memory block 1020 may be coupled through a same source line (SL), e.g., a common SL. The SLs of adjacent memory blocks may be coupled together, and in some embodiments, adjacent memory blocks BLK N and BLK N+1 may be coupled together.

In some embodiments, TSG of each NAND memory string 1022 is coupled to a corresponding BL from which data may be read or written via an output bus (not shown). In some embodiments, each NAND memory string 1022 is configured to be selected or deselected by applying a select voltage (e.g., above a threshold voltage of the transistor with BSG) or a deselect voltage (e.g., 0 V) to a corresponding BSG through one or more BSG lines.

As shown in FIG. 2, NAND memory strings 1022 may be organized into multiple memory blocks 1020, each of which may have a common SL. In some implementations, each memory block 1020 is a basic data unit for erase operation, e.g., all memory cells 10222 on a single memory block 1020 may be erased at the same time. Within a memory block 1020, WL selects which row(s) of memory cells 10222 are affected by read and program operations. In some embodiments, each WL is coupled to a page 1026 of memory cells 10222, where the page 1026 is a basic data unit for program operations.

Figure 3:
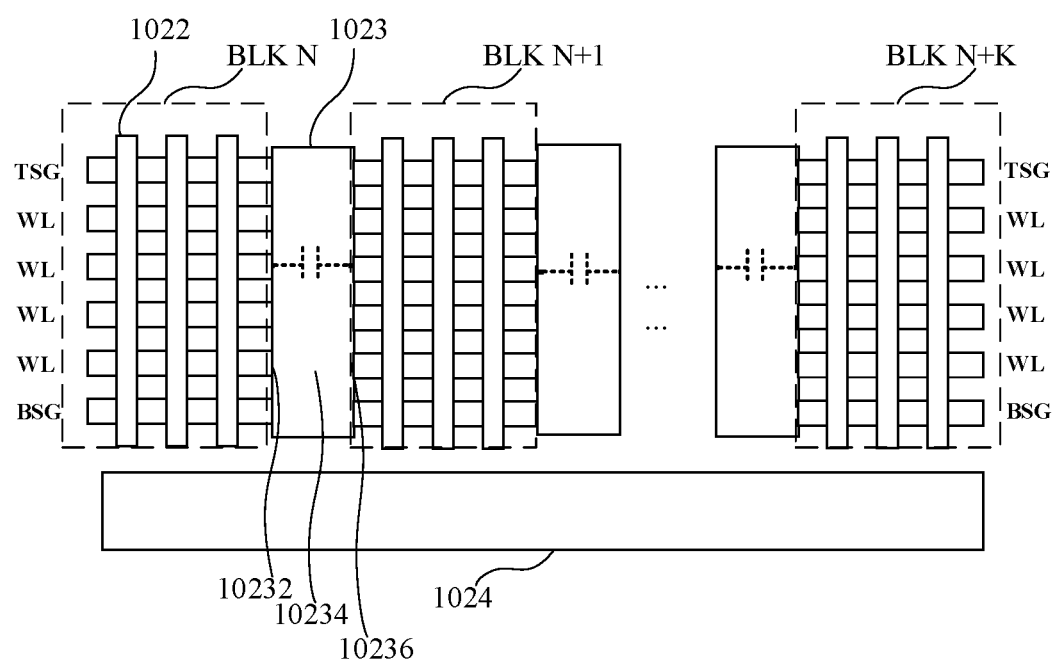
FIG. 3 shows a schematic diagram of a memory cell array including a plurality of memory blocks to which the present disclosure may be applied.

FIG. 3 shows a schematic diagram of a memory cell array including a plurality of memory blocks to which the present disclosure may be applied. The memory cell array may include a plurality of planes, and each plane may include a plurality of memory blocks. FIG. 3 exemplarily shows one plane, which is hereinafter referred to as a "first plane." When performing operations such as erasing the memory cell array, one plane may be selected for performing the operations or a plurality of planes may be selected to perform the operations. The embodiments of the present disclosure are described by taking the first plane as the plane selected from the plurality of planes as an example.

As shown in FIG. 3, the first plane includes a plurality of memory blocks BLK N, BLK N+1 . . . BLK N+X (where N and X are positive integers, X is greater than N), and memory blocks with adjacent serial numbers, such as BLK N and BLK N+1, are adjacent memory blocks. The structure of each memory block may refer to the memory block 1020 in FIG. 2, and the WLs of adjacent memory blocks are coupled to the ACS wall 1023. In some embodiments, the ACS wall 1023 may be high-resistance and low-doping, thus a parasitic capacitance is formed with the WLs of BLK N and the WLs of BLK N+1 serving as two plates (10232, 10236), and the ACS wall 1023 serving as the dielectric material 10234 between the plate 10232 and the plate 10236.

In some embodiments, a high voltage N well (HVNW) 1024 may be formed in the substrate (not shown), and the source end of the NAND memory string 1022 is in contact with the HVNW 1024. For example, the SL may be coupled to the HVNW 1024, so as to apply an erase operating voltage (Verase, for example, a high positive voltage, which may be 20V or higher) to the SL through the peripheral circuit during the erase operation period and, in turn, to the HVNW 1024 (e.g., the source of NAND memory string 1022). Referring to FIG. 3, taking BLK N as the selected memory block (which may be referred to as a first memory block) as an example, in order to erase memory cells 10222 in the selected memory block BLK N, a bias of Verase may be coupled to the SL of BLK N and SLs of unselected memory blocks, BLK N+1, . . . , BLK N+X, which are on the same plane as BLK N. It should be understood that in some examples, the erase operation may be performed at a half-block level, at a quarter-block level, or at a level with any suitable number of blocks or any suitable fraction of one block.

Figure 4:
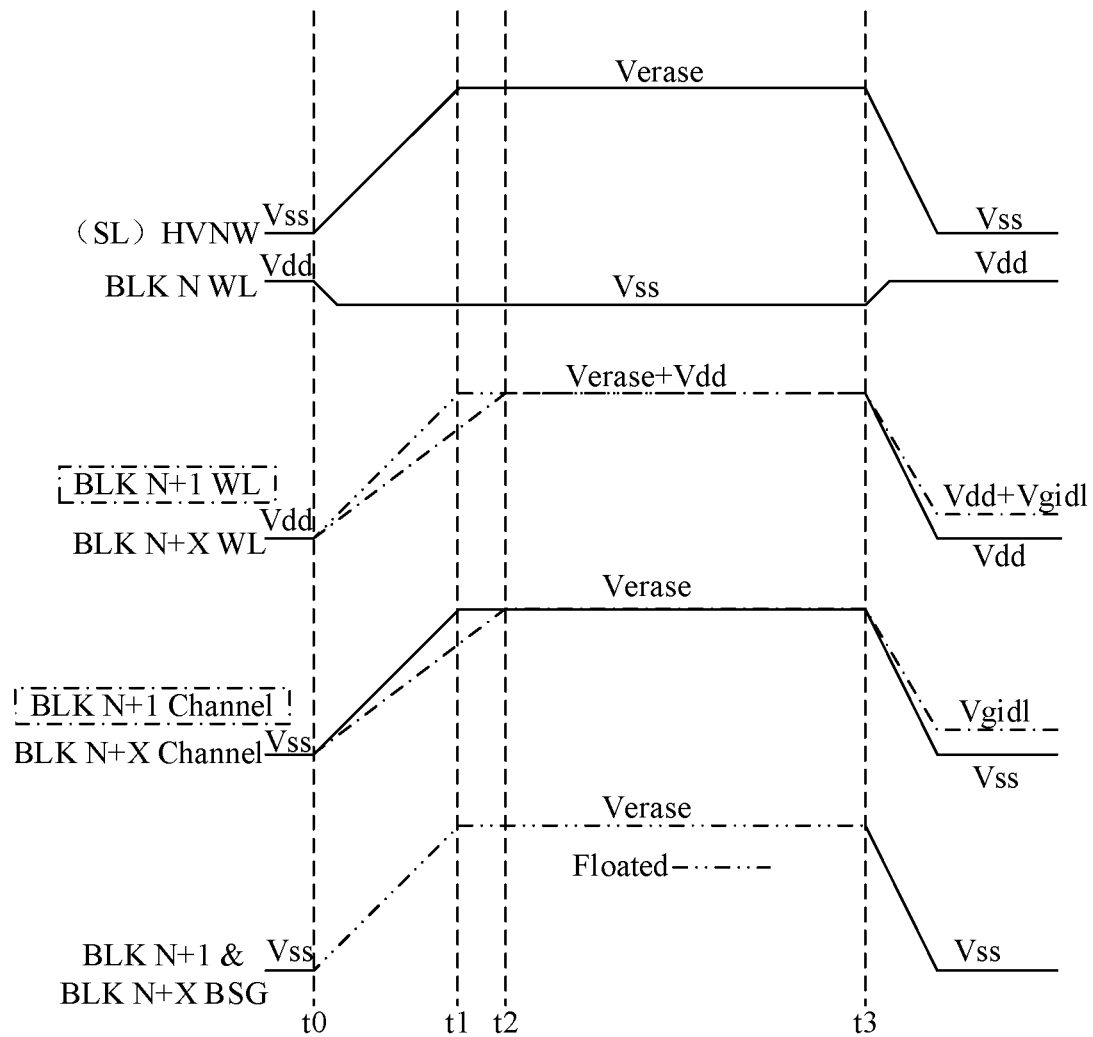
FIG. 4 is a diagram of a first erase pulse waveform shown according to FIG. 3.

FIG. 4 is a diagram of a first erase pulse waveform in the related art shown according to FIG. 3. Referring to FIG. 4, in some embodiments, before the moment to when the first erase pulse is applied, the BSG lines in BLK N+1 . . . BLK N+X are connected to the common ground end voltage (Vss), and the bottom select transistor 10224 with BSG of each NAND memory string 1022 is turned off. The first erase pulse is applied at moment t0, starting from applying Verase to the HVNW, the source voltage of each NAND memory string 1022 in BLK N, BLK N+1 . . . BLK N+X ramps up from an initial voltage (for example, the power supply voltage (Vss)) to Verase at moment t1. At moment t0, an erase control voltage (which, for example, may be Vss) is applied to the WLs of the selected memory block BLK N, so that the WLs of BLK N drops from the initial voltage (for example, the system voltage (Vdd)) to the erase control voltage. At moment t0, the bottom select transistor 10224 with BSG of each NAND memory string 1022 of the selected memory block BLK N receives a voltage from the BSG line to generate a GIDL current, so as to allow holes to flow through the semiconductor channels of each NAND memory string 1022 of the corresponding selected memory block BLK N, so that the threshold voltage of each memory cell 10222 of the selected memory block BLK N is shifted toward a more negative direction, that is, shifted to an erased state.

For the unselected memory blocks BLK N+1 . . . BLK N+X, the BSG lines of these blocks are floated at the moment to, so that the voltage on the BSG lines of BLK N+1 . . . . BLK N+X ramps up with the HVNW and ramps up to Verase at the moment t1. At the same moment t0, the WLs of BLK N+1 . . . BLK N+X are floated. During the ramping up process of the BSG lines between t0~t1, the bottom select transistors 10224 of BLK N+1 . . . BLK N+X are turned on, so that the channel potential of BLK N+1 . . . BLK N+X ramp up with HVNW, and the voltages of WLs of BLK N+1 . . . BLK N+X ramps up accordingly. Since the WL of BLK N+1 is affected by the voltage division of the parasitic capacitance between it and the WL of BLK N, the voltage rising speed of the WL of BLK N+1 is slower than the voltage rising speed of the WL of BLK N+X. Referring to FIG. 4, at moment t1, the initial voltage on WLs of BLK N+X (for example, the system voltage (Vdd)) is coupled and ramps up to Verase+Vdd (if there is a coupling coefficient, it may be less than Verase+Vdd) along with ramping up potential of the channel of BLK N+X. However, the coupled-rising voltage of WLs of BLK N+1 is less than Verase+Vdd. The lower voltage of WLs of BLK N+1 generates a GIDL potential, which causes the potential of the channel of BLK N+1 to ramp up and couples to WLs of BLK N+1, thereby causing the voltage of WLs of BLK N+1 to ramp up to a voltage close to Verase+Vdd at moment t2 after moment t1. The erase discharge starts at the moment t3, and due to the characteristics of the PN junction, the GIDL potential of the channel of BLK N+1 results in the channel of BLK N+1 not being able to discharge completely to the initial potential Vss, as the channel of BLK N+X does, but discharging to Vgidl instead. Starting from the same moment t3, the WLs of BLK N+1 . . . BLK N+X are floated, and the WLs of BLK N+1 also, due to their GIDL potential, are not able to fall back to the system voltage Vdd, as the WLs of BLK N+X do, due to the capacitive coupling effect, but decrease to Vdd+Vgidl instead.

Figure 5:
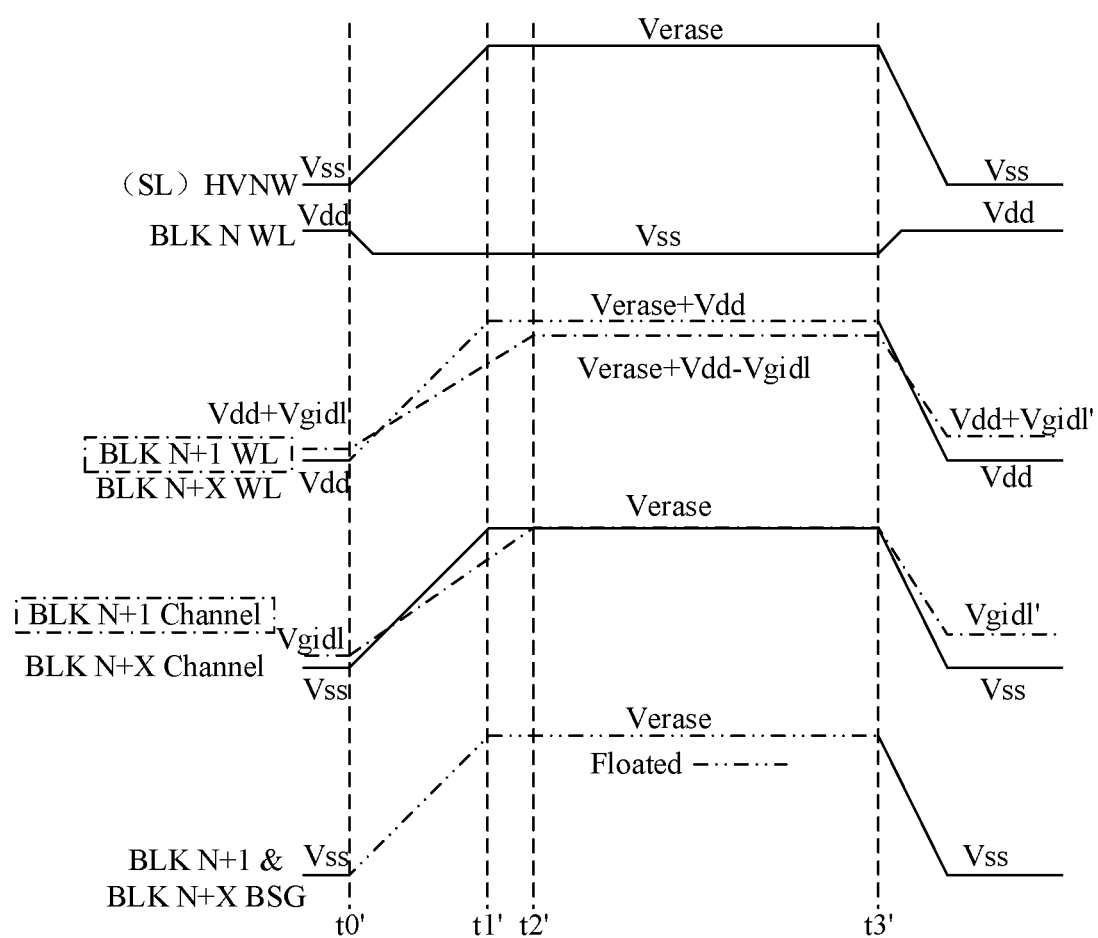
FIG. 5 is a diagram of a second erase pulse waveform shown according to FIG. 4 and FIG. 3.

FIG. 5 is a diagram of a second erase pulse waveform in the related art shown according to FIG. 4 and FIG. 3. The second erase pulse may be the next erase pulse of the first erase pulse shown in FIG. 4. As shown in FIG. 5, the second erase pulse is applied at the moment t0', and the voltage applied to SL, the erase control voltage applied to the WLs of the selected memory block BLK N, and the floating of the BSG line and the WLs of the unselected memory block BLK N+1 . . . BLK N+X are the same as the first erase pulse.

Referring to FIG. 5, for the unselected memory block BLK N+1 . . . BLK N+X, the starting potential of the channel of BLK N+X at the moment t0' is the same as that at the moment of t0 and is still Vss, while the starting potential of the channel of BLK N+1 is higher than that at the moment to and is Vgidl. The initial voltage of the WLs of BLK N+X at the moment t0' is the same as that at the moment to and is still Vdd, while the initial voltage of the WLs of BLK N+1 is higher than that at the moment to and is Vdd+Vgidl. The WLs of BLK N+X are almost unaffected, and may still be coupled and ramp up to Verase+Vdd at the moment t1' along with the ramping up potential of the channel. However, since the starting potential of the channel of BLK N+1 becomes higher, it no longer generates the same GIDL potential as the WLs of BLK N+1 at the moment t1', so that the portion that ramps up due to the coupling of the WLs of BLK N+1 disappears or at least decreases to a certain extent between the moment t1' and the moment t2, thereby resulting in that the voltage of the WLs of BLK N+1 ramps up to a value that is lower than Verase+Vdd, e.g., Verase+Vdd-Vgidl, at the moment t2'. The erase discharge starts at the moment t3', the channel of BLK N+1 discharges to Vgidl' higher than Vgidl, and the WLs of BLK N+1 decrease to Vdd+Vgidl' higher than Vdd+Vgidl.

After cycling multiple erase pulses, a voltage difference will accumulate between the WLs and the channel of BLK N+1, which is equivalent to weak erase of BLK N+1, thereby leading to an additional loss in the read-window margin or the voltage distribution ESUM of the memory during the erase process.

FIG. 6 is a flowchart of a memory operating method according to some embodiments. The method shown in FIG. 6 may, for example, be applied to the memory cell array shown in FIG. 3 to solve the technical problem of additional loss in the read-window margin or the voltage distribution ESUM of the memory caused by adjacent memory blocks of the selected memory block as shown in FIG. 4 and FIG. 5.

Referring to FIG. 6, a method 60 provided by an embodiment of the present disclosure may include the following operations.

At operation S602, a bias voltage is applied to a bottom select line of a second memory block during a first time period, so that a bottom select transistor of the second memory block is turned on.

In some embodiments, the first time period may be a time period before the erase pulse, for example, it may be a time period before the moment to in FIG. 4, or it may be a time period before the moment to' in FIG. 5.

In some embodiments, the second memory block may include all unselected memory blocks (e.g., BLK N+1 . . . BLK N+X in FIG. 3), or may include only a third memory block adjacent to the selected memory block (e.g., BLK N+1 in FIG. 3), or may include all memory blocks in a plane including the selected memory block (e.g., BLK N, BLK N+1 . . . BLK N+X). Referring to FIG. 2, the bottom select transistor 10224 of each NAND memory string 1022 on the second memory block may be turned on by applying a bias voltage to the BSG line.

In some embodiments, when selecting the magnitude of the bias voltage, on the premise that it is greater than the threshold voltage of the bottom select transistor of the second memory block, it may be considered that the sum of the erase operating voltage and the bias voltage is less than a preset voltage threshold value. The bias voltage may range from 1V to 7V, for example, it may take a value of 1V, 2V, 2.5V, 5V, 6V, 7V, etc.

At operation S604, the first erase operation is performed during a second time period, and the second time period is after the first time period.

In some embodiments, the erase pulse may be applied at the beginning of the second time period. For example, the moment to in FIG. 4 may be the beginning of the second time period, and performing the first erase operation may include applying the first erase pulse. For another example, the moment to' in FIG. 5 may also be the beginning of the second time period, and performing the first erase operation may include applying the second erase pulse.

In some embodiments, the performing the first erase operation may include the following operations S6042 and S6044.

At operation S6042, the erase operating voltage is provided to the source line of the first memory block.

In some embodiments, the erase operating voltage may be a high positive voltage, which may be 20V or higher, and may be represented as the above Verase.

In some embodiments, the first memory block may be a selected memory block (e.g., BLK N in FIG. 3), in which case the second storage block may include all unselected memory blocks (e.g., BLK N+1 . . . BLK N+X in FIG. 3), or may include only those adjacent to the selected memory block (e.g., BLK N+1 in FIG. 3). The performing the first erase operation may further include applying an erase control voltage (which, for example, may be Vss) to the word lines of the first memory block to erase the first memory block, and a specific implementation manner may refer to FIG. 7. Referring to FIG. 3, by applying Verase to the HVNW 1024, the erase operating voltage may be provided to the source line of the first memory block while the erase operating voltage is also provided to the source line of the second memory block.

At operation S6044, the bottom select line of the second memory block is set to a floating state.

In various implementation manners of the second memory block described above, the setting the bottom select line of the second memory block to a floating state includes setting the bottom select line of an adjacent memory block (e.g., BLK N+1 in FIG. 3, and the description below is denoted by BLK N+1) of the selected memory block to a floating state, such that the voltage on the BSG line of BLK N+1 may ramp up from the bias voltage with the voltage on the source line. Since the bottom select transistor of BLK N+1 is turned on in the first time period before performing the first erase operation according to operation S602, the bottom select transistor of BLK N+1 may continue to be turned on during the second time period. In the third time period, the bottom select line of BLK N+1 is still set to be floated, and may be floated to the bias voltage. That is, the bottom select transistor of BLK N+1 may be in the conductive state during the discharge phase, so the Vgidl generated in the channel due to the voltage division effect of the parasitic capacitance during the ramping up phase may continue to discharge to the initial potential Vss, so that, in the discharging phase, the WLs of BLK N+1 may be restored to a voltage closer to the voltage before ramping up and, in the next erase cycle, voltage accumulation can be reduced or even eliminated. This may reduce the voltage difference between the WLs and the channel of the second memory block after multiple erase cycles and, thus, reducing the loss in the read-window margin or the voltage distribution ESUM of the memory during the erase process.

FIG. 7 shows a schematic diagram of the processing procedure of operation S604 shown in FIG. 6 according to an embodiment. FIG. 7 is related to FIG. 6 in that FIG. 7 shows an implementation manner of performing the first erase operation in the case where the first memory block is the selected memory block. The above operation S604 may include the following operations S702 to S706.

At operation S702, an erase operating voltage is provided to the source line of the first memory block.

Referring to FIG. 3, by applying Verase to the HVNW 1024, the erase operating voltage may be provided to the source line of the first memory block while the erase operating voltage is also provided to the source line of the second memory block.

At operation S704, an erase control voltage is provided to the word lines of the first memory block, and the erase operating voltage is greater than the erase control voltage.

In some embodiments, the erase control voltage is a low voltage below the erase operating voltage. Also at this phase (e.g., the second time period), a voltage is provided to the bottom select line of the first memory block and further provided to the bottom select transistor, thereby generating a GIDL current to generate holes flowing through the channel of the first memory block, so that the threshold voltage of each memory cell of the first memory block is shifted in a more negative direction, e.g., to an erased state.

At operation S706, the bottom select line of the second memory block is set to a floating state In some embodiments, the specific implementation manner of operation S706 may refer to operation S6044.

Figure 8:
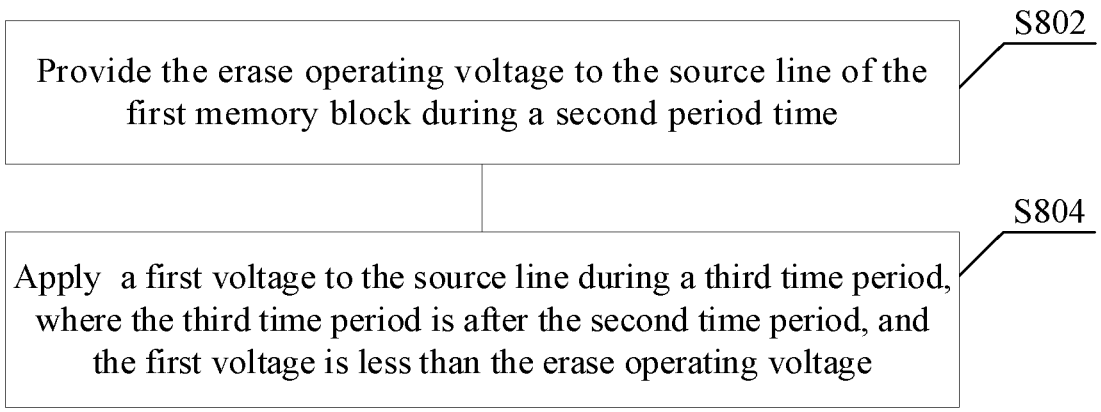
FIG. 8 shows a schematic diagram of a process for applying a voltage to a selected memory block during the erasing phase according to FIG. 6.

FIG. 8 shows a schematic diagram of a process for applying a voltage to a selected memory block during the erasing phase according to FIG. 6. FIG. 8 differs from FIG. 6 in that FIG. 8 also illustrates a voltage applying operation in the erase discharge phase, e.g., after operation S6042 (operation S802), an operation S804 may be further included.

At operation S802, the erase operating voltage is provided to the source line of the first memory block during a second period of time.

In some embodiments, the specific implementation manner of operation S802 may refer to operation S6042.

At operation S804, a first voltage is applied to the source line during a third time period. The third time period is after the second time period, and the first voltage is less than the erase operating voltage.

Taking FIG. 3 as an example, in various implementation manners of the first memory block described At operation S6042, applying the first voltage to the source line of the first memory block may apply the first voltage to the source lines of all memory blocks including BLK N, BLK N+1 . . . BLK N+X.

Figure 10:
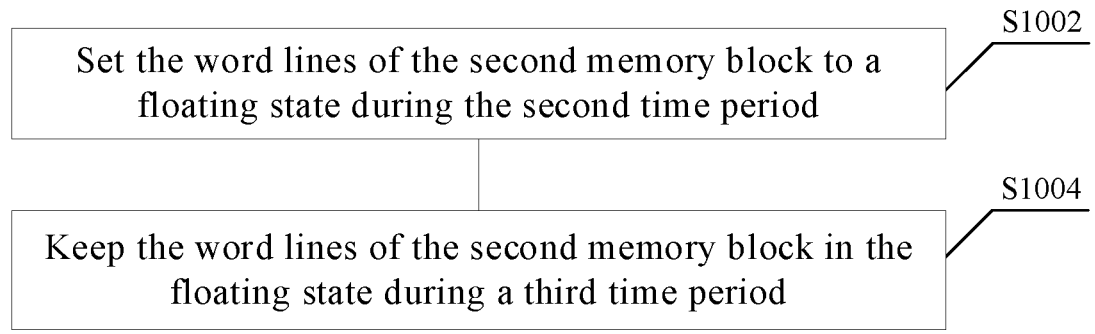
FIG. 10 shows a schematic diagram of a process for operating word lines of an unselected memory block during the erasing phase according to FIG. 6.
Figure 11:
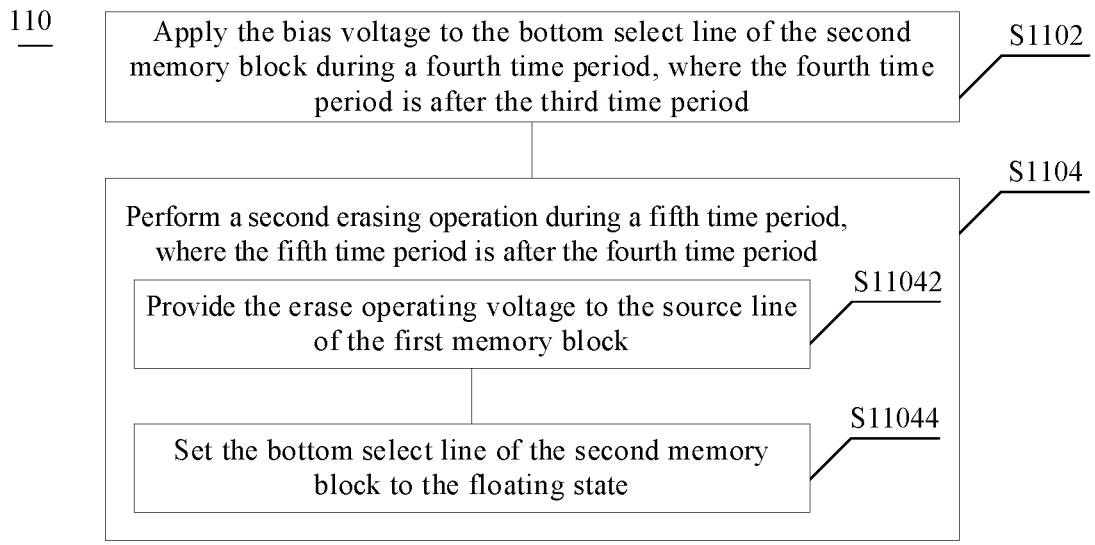
FIG. 11 is a flow chart of another memory data processing method according to FIG. 6.
Figure 12:
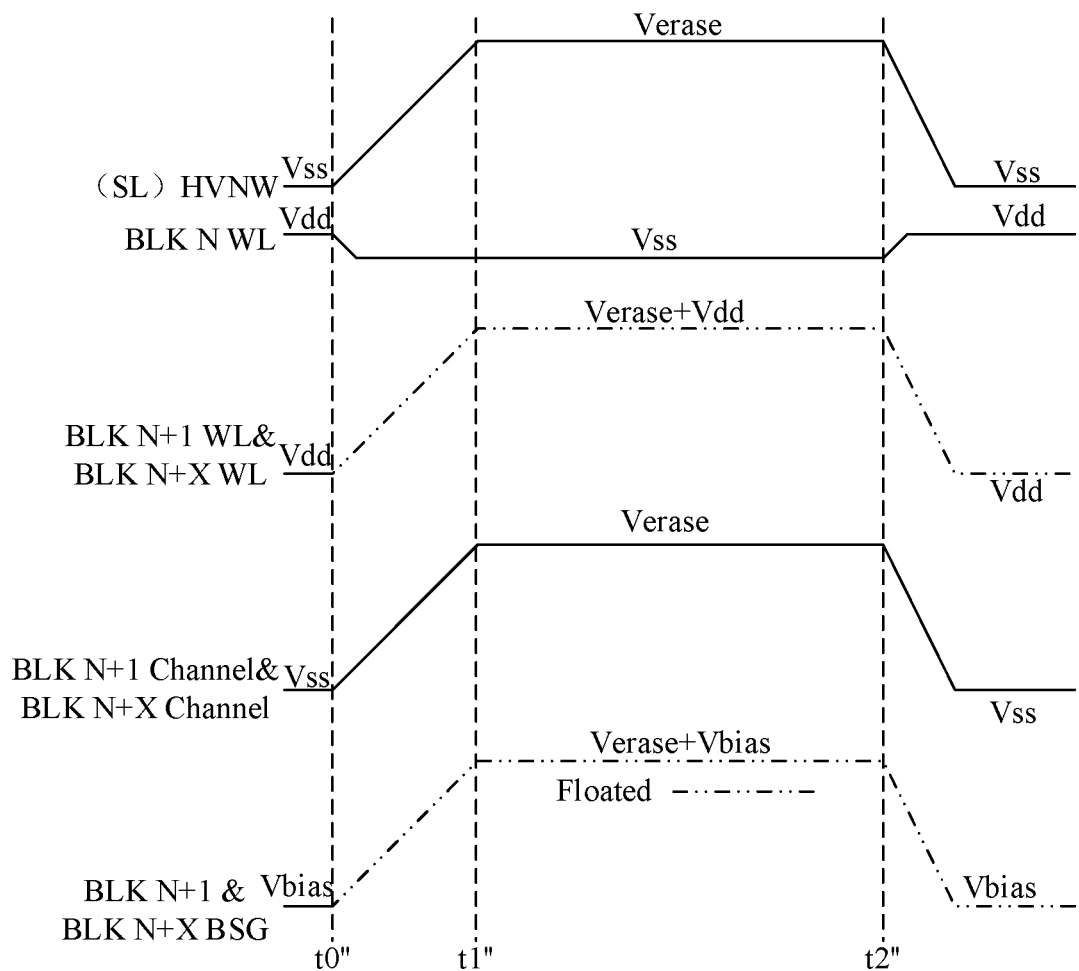
FIG. 12 is a diagram of an erase pulse waveform shown according to FIG. 6 to FIG. 11.

In some embodiments, FIG. 12 is a diagram of an erase pulse waveform shown according to FIG. 6 to FIG. 11. Taking the first erase pulse being issued (e.g., performing the first erase operation) at the moment t0" as an example, an erase operating voltage (Verase) is applied to the source line by applying the erase operating voltage to the HVNW, and the erase operating voltage is reached at the moment t1". Referring to FIG. 12, the first time period may be a time period before the moment t0", the second time period may be a time period between t0"~t2", and the third time period may be a time period after the moment t2", e.g., the erase discharge phase. The first voltage is a low voltage, which may be, for example, Vss. The source line voltage may fall back to the first voltage by applying, from the moment t2", the first voltage to the HVNW which may also fall back from the erase operating voltage to the first voltage. The first erase operation is completed and the next erase pulse is awaited.

Figure 9:
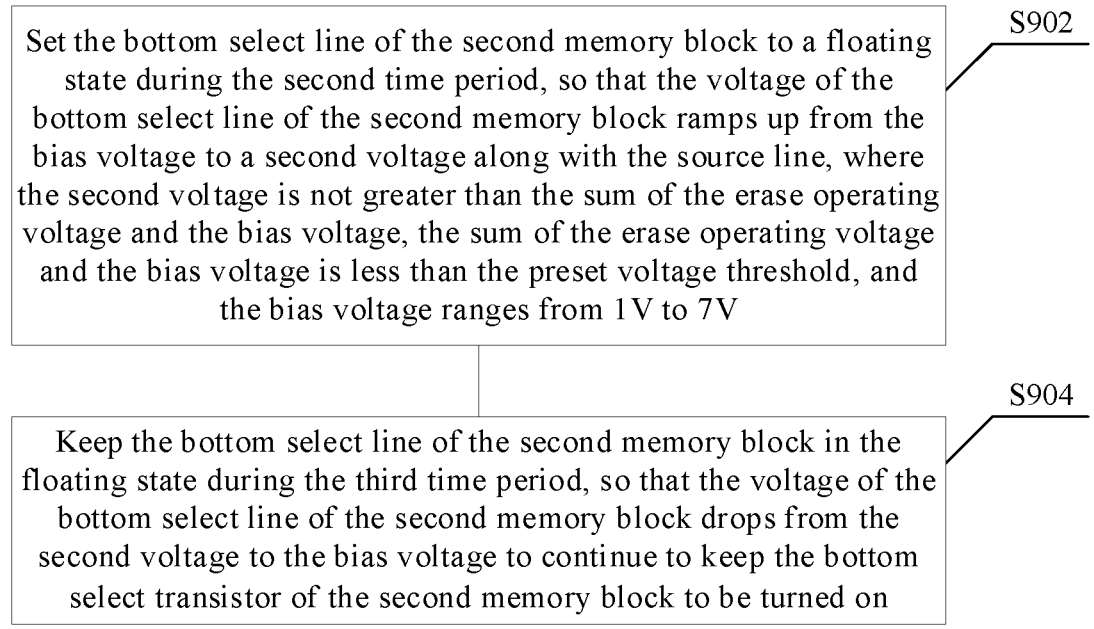
FIG. 9 shows a schematic diagram of a process for applying a voltage to an unselected memory block during the erasing phase according to FIG. 6.

FIG. 9 shows a schematic diagram of a process for applying a voltage to an unselected memory block during the erasing phase according to FIG. 6. FIG. 9 is an implementation manner where the second memory block in FIG. 6 is an unselected memory block. FIG. 9 shows that operation S6044 may further include operation S902, and after operation S6044, operation S904 may be further included.

At operation S902, the bottom select line of the second memory block is set to a floating state during the second time period, so that the voltage of the bottom select line of the second memory block ramps up from the bias voltage to a second voltage along with the source line, where the second voltage is not greater than the sum of the erase operating voltage and the bias voltage. The sum of the erase operating voltage and the bias voltage is less than a preset voltage threshold, and the bias voltage ranges from 1V to 7V.

In some embodiments, from the beginning of the second time period, the voltage on the bottom select line of the second memory block is the bias voltage. After the bottom selection line of the second memory block is floated, the voltage thereof is coupled (for example, through HVNW) and ramps up, along with the source line, to the sum of the erase operating voltage and the bias voltage. If there is a coupling coefficient, it may be less than the sum of the erase operating voltage and the bias voltage. When designing the magnitude of the bias voltage, it may be considered to make the sum of the erase operating voltage and the bias voltage less than the preset voltage threshold, thereby avoiding breakdown of the bottom select transistor of the second memory block during the second time period.

At operation S904, the bottom select line of the second memory block is kept in the floating state during the third time period, so that the voltage of the bottom select line of the second memory block drops from the second voltage to the bias voltage, thereby continuing to keep the bottom select transistor of the second memory block to be turned on.

In some embodiments, referring to FIG. 12, the bottom select line of the second memory block may be kept in the floating state during the third time period, e.g., after the moment t2", thereby causing the voltage of the bottom select line of the second memory block to fall back from the second voltage to the bias voltage, and continuing to keep the bottom select transistor of the second memory block to be turned on through the beginning of the next erase pulse. When the next erase pulse begins, the bottom selector transistor of the second memory block is still turned on, thereby reducing the voltage difference between the WLs and the channel of the second memory block during multiple erase cycles, and reducing the loss in the read-window margin or the voltage distribution ESUM of the memory during the erase process.

FIG. 10 shows a schematic diagram of a process for operation word lines of an unselected memory block during the erasing phase according to FIG. 6. FIG. 10 is an implementation manner where the second memory block in FIG. 6 is an unselected memory block. FIG. 10 shows that operation S604 may further include operations S1002 and S1004.

At operation S1002, the word lines of the second memory block are set to a floating state during the second time period.

Taking the implementation manner in which the second memory block is any unselected memory block (such as any block among BLK N+1 . . . BLK N+X in FIG. 3, hereinafter referred to as BLK N+X) as an example, referring to FIG. 12, since the bottom select transistor of BLK N+X has been turned on at the moment t0", the voltage on the BSG line is Vbias. During the ramping up process of the BSG line during the second time period, e.g., from t0" to t1", the bottom select transistor of BLK N+X continues to be turned on. Referring again to FIG. 12, at the moment t1", the initial voltage on WLs of BLK N+X (e.g., the system voltage (Vdd)) is coupled and ramps up to Verase+Vdd (if there is a coupling coefficient, it may be less than Verase+Vdd) along with ramping up potential of the channel of BLK N+X. The coupled-rising voltage of WLs of the BLK N+1 may also reach Verase+Vdd.

At operation S1004, the word lines of the second memory block are kept in the floating state during the third time period.

Still taking the implementation manner in which the second memory block is any unselected memory block as an example, referring to FIG. 12, the erase discharge is started at the moment t2", and WLs of BLK N+X are kept in the floating state. Starting from the moment t2", since the bottom select line of BLK N+X is floated to the bias voltage, the bottom select transistor of BLK N+X is still in the conductive state. Therefore, regardless of whether X is 1 or not, the channel of BLK N+X may continue to discharge to the initial potential Vss, and thus the WLs of BLK N+1 may also fall back to the system voltage Vdd like the WLs of BLK N+X (X is not 1). Accordingly, in the next erase pulse, the initial potential of the channel of BLK N+1 is unchanged and remains at Vss, and the initial voltage of the WLs of BLK N+1 is unchanged and remains at Vdd. That is, the waveform of the next erase pulse may still be illustrated by FIG. 12, thereby realizing the elimination of the voltage difference between the WLs and the channel of the second memory block during multiple erase cycles, and reducing the loss in the read-window margin or the voltage distribution ESUM of the memory during the erase process. In practical applications, it is possible to reduce the loss by 100 mV.

FIG. 11 is a flow chart of another memory data processing method according to FIG. 6. FIG. 11 is related to FIG. 6 in that the second erase operation illustrated in FIG. 11 is the next erase operation after the first erase operation in multiple erase cycles.

Referring to FIG. 11, the method 110 provided by an embodiment of the present disclosure may include the following operations.

At operation S1102, the bias voltage is applied to the bottom select line of the second memory block during a fourth time period, where the fourth time period is after the third time period.

At operation S1104, a second erasing operation is performed during a fifth time period, where the fifth time period is after the fourth time period.

At operation S11042, the erase operating voltage is provided to the source line of the first memory block.

At operation S11044, the bottom select line of the second memory block is set to the floating state.

In some embodiments, the fourth time period corresponds to the first time period, and the fifth time period corresponds to the second time period. The specific implementation manners of operation S1102 to S11044 may refer to the specific implementation manners of operation S602 to operation S6044.

FIG. 13 is a structural block diagram of a memory shown according to FIG. 6 to FIG. 11. The memory cell array 1302 shown in FIG. 13 is an example of the memory cell array 102 in FIG. 1, that is, the peripheral circuit 104 may include a page buffer/sense amplifier 1304, a column decoder/BL driver 1306, a source line driver 1307, a row decoder/WL driver/BSG driver 1308, a voltage generator 1310, a control circuit 1312, a register 1314, an input/output circuit 1316, etc. It should be understood that in some examples, additional peripheral circuit not shown in FIG. 13 may also be included.

The page buffer/sense amplifier 1304 may be configured to read data from and program (write) data to memory cell array 1302 according to control signals from the control circuit 1312. In one example, the page buffer/sense amplifier 1304 may store one page of program data (write data) to be programmed into one page 1026 of the memory cell array 102. In another example, the page buffer/sense amplifier 1304 may also perform program verify operations to ensure that the data has been properly programmed into memory cells 10222 coupled to the selected memory block 1020. In yet another example, the page buffer/sense amplifier 1304 may also sense a low power signal from the BL representing the data bits stored in the memory cells 10222 and amplify the small voltage swing to a recognizable logic level during a read operation. The column decoder/BL driver 1306 may be configured to be controlled by the control circuit 1312 and select one or more NAND memory strings 1022 by applying bit line voltages generated from voltage generator 1310.

The source line driver 1307 may be configured to be controlled by the control circuit 1312 and provide a source voltage to one or more NAND memory strings 1022 by applying a source voltage generated from voltage generator 1310, such as an erase operating voltage, a first voltage and so on.

The row decoder/WL driver/BSG driver 1308 may be configured to be controlled by the control circuit 1312 to drive the WLs using the WL voltage generated from the voltage generator 1310 and may also select/deselect and drive the BSG line. The voltage generator 1310 may be configured to be controlled by the control circuit 1312 and generate a WL voltage to be provided to the memory cell array 1302, such as an erase control voltage, etc., and may also be configured to be controlled by the control circuit 1312 and generate a BSG line voltage to be provided to memory cell array 1302, such as a bias voltage, etc.

As a part of the peripheral circuit, the control circuit 1312 may be coupled to the other peripheral circuits described above and configured to control the operations of the other peripheral circuits. The register 1314 may be coupled to the control circuit 1312 and include status registers, command registers, and address registers for storing status information, command operation codes (OP codes), and command addresses for controlling the operations of each peripheral circuit. The input/output circuit 1316 may be coupled to the control circuit 1312 and serves as a control buffer to buffer and relay control commands received from a host (not shown) to the control circuit 1312 and status information received from the control circuit 1312 to the host. The input/output circuit 1316 may also be coupled to the column decoder/BL driver 1306 via a data bus (not shown) and serve as a data input/output interface and data buffer, so as to buffer and relay data to and from the memory cell array 1302.

Figure 14:
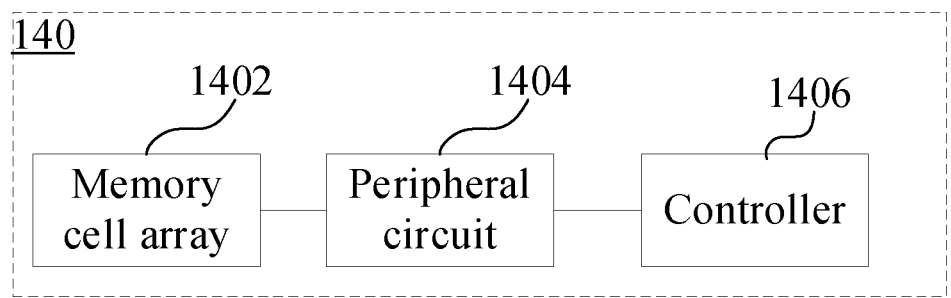
FIG. 14 is a schematic structural diagram of a memory system shown according to FIG. 6 to FIG. 11.

FIG. 14 is a schematic structural diagram of a memory system shown according to FIG. 6 to FIG. 11. FIG. 3 illustrates a block diagram of an example memory system 140 having a memory device according to some aspects of the contents of the present disclosure. The memory system 140 may be a memory system in a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory devices therein, and be connected to a host (not shown) in the electronic device. The host may be a processor of an electronic device, such as a central processing unit (CPU), or a system-on-chip (SoC), such as an application processor (AP). The host may be configured to send data to or receive data from the memory system 140.

The memory system 140 may include any memory device disclosed in embodiments of the present disclosure, such as a NAND flash memory device (e.g., a three-dimensional (3D) NAND flash memory device) as described in embodiments of the present disclosure that may reduce the loss in the read-window margin or the voltage distribution ESUM during an erase operation.

As shown in FIG. 14, the memory system 140 may include a memory cell array 1402, a peripheral circuit 1404, and a controller 1406. The memory cell array 1402 and the peripheral circuit 1404 constitute a memory device. The controller 1406 is coupled to the peripheral circuit 1404 and the host, and is configured to control the peripheral circuit 1404 to operate the memory cell array 1402. The controller 1406 may manage data stored in the memory cell array 1402 and communicate with the host. In some embodiments, the controller 1406 is designed for operating in a low duty-cycle environment like a secure digital (SD) card, a compact flash (CF) card, a universal serial bus (USB) flash drive, or other medium for use in electronic devices such as a personal computer, a digital camera, a mobile phone, etc. In some embodiments, the controller 306 is designed for operating in a high duty-cycle environment like a solid state drive (SSD) or an embedded multi-media-card (eMMC) used as data storage for mobile devices, such as a smartphone, a tablet, a laptop computer, etc., and an enterprise storage array. The controller 1406 may be configured to control operation of the peripheral circuit 1404 on the memory cell array 1402, such as read, erase, and program operations. The controller 1406 may also be configured to manage various functions with respect to the data stored or to be stored in the memory cell array 1402 including, but not limited to bad-block management, garbage collection, logical-to-physical address conversion, wear leveling, etc. In some embodiments, the controller 1406 is further configured to process error correction codes (ECCs) with respect to the data read from or written to the memory cell array 1402. Any other suitable functions may be performed by the controller 1406 as well, for example, formatting memory device. The controller 306 may communicate with an external device (e.g., a host) according to a particular communication protocol. For example, the controller 1406 may communicate with the external device through at least one of various interface protocols, such as a universal serial bus (USB) protocol, an multi-media card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

The controller 1406 and one or more memory devices including the memory cell array 1402 and the peripheral circuit 1404 may be integrated into various types of storage devices, for example, be included in the same package, such as a universal flash storage (UFS) package or an eMMC package. That is, the memory system 140 may be implemented and packaged into different types of terminal electronic products.

The embodiments of the present disclosure have been specifically shown and described above. It should be appreciated that the present disclosure is not limited to the detailed structures, manners of arrangements, or methods of implementation described herein; rather, the present disclosure is intended to cover various modifications and equivalent arrangements encompassed within the spirit and scope of the appended claims.

What is claimed is:

1. A method of operating a memory, comprising:
applying a bias voltage to a bottom select line of a second memory block of the memory during a first time period to turn on a bottom select transistor of the second memory block, the memory comprising a first memory block and the second memory block, and the bottom select transistor is coupled to the bottom select line;
performing a first erase operation during a second time period after the first time period by:
providing an erase operating voltage to a source line of the first memory block; and
setting the bottom select line of the second memory block to a floating state; and
causing a voltage of the bottom select line of the second memory block to return to the bias voltage after the bottom select line of the second memory block has been held in the floating state.

2. The method of claim 1, wherein the performing the first erase operation further comprises:
applying an erase control voltage to a word line of the first memory block, the erase operating voltage being greater than the erase control voltage.

3. The method of claim 2, further comprising:
applying a first voltage to the source line during a third time period,
wherein the third time period is after the second time period, and the first voltage is less than the erase operating voltage.

4. The method of claim 1, wherein the setting the bottom select line of the second memory block to the floating state comprises:
setting the bottom select line of the second memory block to the floating state during the second time period to cause the voltage of the bottom select line of the second memory block to ramp up, along with the source line, to a second voltage from the bias voltage, wherein the second voltage is less than or equal to a sum of the erase operating voltage and the bias voltage.

5. The method of claim 4, wherein the causing the voltage of the bottom select line of the second memory block to return to the bias voltage after the bottom select line of the second memory block has been held in the floating state comprises:
keeping the bottom select line of the second memory block in the floating state during a third time period to cause the voltage of the bottom select line of the second memory block to drop from the second voltage to the bias voltage to continue keeping the bottom select transistor of the second memory block turned on,
wherein the third time period is after the second time period.

6. The method of claim 1, wherein a sum of the erase operating voltage and the bias voltage is less than a preset voltage threshold.

7. The method of claim 1, wherein:
the performing the first erase operation further comprises:
setting a word line of the second memory block to a floating state, and
the method further comprises:
keeping the word line of the second memory block in the floating state during a third time period, the third time period being after the second time period.

8. The method of claim 1, wherein the second memory block is an unselected memory block adjacent to the first memory block.

9. The method of claim 3, further comprising:
applying the bias voltage to the bottom select line of the second memory block during a fourth time period, the fourth time period being after the third time period; and
performing a second erase operation during a fifth time period after the fourth time period by:
providing the erase operating voltage to the source line of the first memory block; and
setting the bottom select line of the second memory block to the floating state.

10. The method of claim 1, wherein the bias voltage ranges from 1V to 7V.

11. The method of claim 1, wherein the memory comprises a plurality of planes, the plurality of planes comprise a first plane, the first plane is a plane selected from the plurality of planes, and the first memory block and the second memory block are located on the first plane.

12. A memory, comprising:
a memory cell array, wherein the memory cell array comprises a plurality of memory blocks, each memory block of the plurality of memory blocks comprises a bottom select transistor, the bottom select transistor is coupled to a bottom select line, and the plurality of memory blocks comprise a first memory block and a second memory block; and
a peripheral circuit coupled to the memory cell array, wherein the peripheral circuit is configured to:
apply a bias voltage to the bottom select line of the second memory block during a first time period to turn on the bottom select transistor of the second memory block;
perform a first erase operation during a second time period after the first time period by:
providing an erase operating voltage to a source line of the first memory block; and
setting the bottom select line of the second memory block to a floating state; and
cause a voltage of the bottom select line of the second memory block to return to the bias voltage after the bottom select line of the second memory block has been held in the floating state.

13. The memory of claim 12, wherein:
the peripheral circuit comprises a control circuit, a voltage generator, a bottom select line driver, and a source line driver,
the voltage generator is configured to generate the bias voltage,
the control circuit is configured to control the bottom select line driver to apply the bias voltage to the bottom select line of the second memory block during the first time period to turn on the bottom select transistor of the second memory block,
the voltage generator is further configured to generate the erase operating voltage,
the control circuit is further configured to control the source line driver to apply the erase operating voltage to the source line of the first memory block during the second time period, and
the control circuit is further configured to control the bottom select line driver to set the bottom select line of the second memory block to the floating state during the second time period.

14. The memory of claim 13, wherein:
the voltage generator is further configured to generate an erase control voltage,
the erase operating voltage is greater than the erase control voltage,
the peripheral circuit further comprises a word line driver, and
the control circuit is further configured to control the word line driver to apply the erase control voltage to a word line of the first memory block during the second time period.

15. The memory of claim 14, wherein:
the voltage generator is further configured to generate a first voltage,
the first voltage is less than the erase operating voltage,
the control circuit is further configured to control the source line driver to apply the first voltage to the source line of the first memory block during a third time period, and
the third time period is after the second time period.

16. The memory of claim 13, wherein:
the control circuit is further configured to control the bottom select line driver to set the bottom select line of the second memory block to the floating state during the second time period to cause the voltage of the bottom select line of the second memory block to ramp up, along with the source line, to a second voltage from the bias voltage, and
the second voltage is less than or equal to a sum of the erase operating voltage and the bias voltage.

17. The memory of claim 16, wherein:
the control circuit is further configured to control the bottom select line driver to keep the bottom select line of the second memory block in the floating state during a third time period, causing the voltage of the bottom select line of the second memory block to drop from the second voltage to the bias voltage to continue keeping the bottom select transistor of the second memory block turned on, and
the third time period is after the second time period.

18. The memory of claim 12, wherein a sum of the erase operating voltage and the bias voltage is less than a preset voltage threshold.

19. The memory of claim 14, wherein:
the control circuit is further configured to control the word line driver to set a word line of the second memory block to a floating state during the second time period,
the control circuit is further configured to control the word line driver to keep the word line of the second memory block in the floating state during a third time period, and
the third time period is after the second time period.

20. A memory system, comprising:
a memory and a controller coupled to the memory, wherein:
the memory comprises a memory cell array and a peripheral circuit, wherein the memory cell array comprises a plurality of memory blocks, each memory block of the plurality of memory blocks comprises a bottom select transistor, the bottom select transistor is coupled to a bottom select line, the plurality of memory blocks comprise a first memory block and a second memory block, and the peripheral circuit is coupled to the memory cell array; and
the controller is configured to control the peripheral circuit to:
apply a bias voltage to the bottom select line of the second memory block during a first time period to turn on the bottom select transistor of the second memory block;
perform a first erase operation during a second time period after the first time period by:
providing an erase operating voltage to a source line of the first memory block; and
setting the bottom select line of the second memory block to a floating state; and
cause a voltage of the bottom select line of the second memory block to return to the bias voltage after the bottom select line of the second memory block has been held in the floating state.

* * * * *